United States Patent
Folkes

[15] 3,666,085
[45] May 30, 1972

[54] MECHANICAL BELTING

[72] Inventor: Hugh L. Folkes, Saint Leonard's-on-sea, England

[73] Assignee: Dunlop Holdings Limited, London, England

[22] Filed: Jan. 19, 1970

[21] Appl. No.: 3,925

[30] Foreign Application Priority Data

Jan. 25, 1969 Great Britain .......................4,334/69

[52] U.S. Cl. .............................................................198/193
[51] Int. Cl. .........................................................B65g 15/30
[58] Field of Search ........................198/193; 74/DIG. 7, 237; 161/44, 43, 49, 78

[56] References Cited

UNITED STATES PATENTS 3,485,707  12/1969  Spicer........................................198/193
3,498,684  3/1970  Hallaman..................................198/193
R26,731  11/1969  Robinson....................................161/57

FOREIGN PATENTS OR APPLICATIONS 633,176  7/1936  Germany..................................198/193

Primary Examiner—Richard E. Aegerter
Attorney—Stevens, Davis, Miller & Mosher

[57] ABSTRACT

Mechanical belting having transverse rigidity provided by spaced apart transversely extending layers, one of these layers is of compression-resisting material and the other of tension-resisting material, the spaced apart layers giving a beam effect. The layer of tension-resisting material is of troughed shape in a transverse cross section. By this means, the centers of the layers are spaced further apart than their lateral edges, giving an increased resistance to troughing of the belt.

10 Claims, 6 Drawing Figures

Patented May 30, 1972

MECHANICAL BELTING

This invention relates to mechanical belting and particularly to conveyor belting of the kind which is used to carry a load without undue sagging. An important example of belting of this kind is belting for conveying human passengers when the belt is supported only at its edges. Such a belt is required to be rigid in a transverse direction to carry the passengers without sagging, or troughing, and must be flexible in the longitudinal direction to pass round pulleys or to enable a change in direction to be made in a vertical plane.

Known methods of achieving transverse rigidity include the provision in a belt of two parallel layers of steel rods or cords in a flexible matrix, such as rubber, the layers being located respectively near to the upper and lower surfaces of the belt so that, considered in transverse cross section, the of structure acts as a reinforced beam.

To make the best use of the steel, loads on the belt must be transmitted by the flexible body of the belt to cause a compressive stress in the upper layer of steel and a tensile stress in the lower layer. As the rubber and textile material used in the body 'f the belt have to be flexible the transmission of load to the steel layers is not as effective as would be desired, and the transverse rigidity of the belt is reduced below a possible maximum.

The present invention provides mechanical belting with a high degree of transverse rigidity.

Mechanical belting, in accordance with the present invention, comprises a body of flexible material incorporating a transversely extending layer of compression-resisting material and a transversely extending layer of tension-resisting material, the layer of tension-resisting material being of troughed shape considered in a transverse cross section, at least the central portion of the layer of tension-resisting material spaced from the layer of compression-resisting material.

The invention will be readily understood by the following description of certain embodiments by way of example in conjunction with the accompanying diagrammatic drawings, in which.

Figure 1:
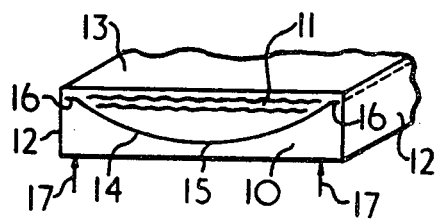
FIG. 1 is a transverse cross section, of one form of belt, in perspective.

In the various embodiments to be described, the same reference numerals are used to indicate the same parts. Considering first FIG. 1, the belt comprises a body 10 of rubber reinforced against longitudinal tensile stresses by a composite woven layer 11 of textile material. Composite layer 11 may comprise a plurality of layers, two being shown in FIG. 1. Layer 11 extends the length of the belt and also extends across the belt.

The layer 11 is arranged adjacent the load carrying surface 13, which is uppermost in operation, for example as a passenger conveyor. In this position it forms a reinforcement for a compression-resisting layer which comprises the rubber in which the layer 11 is embedded and the layer 11 itself. The compression-resisting layer is capable of resisting transverse compression stresses arising in the portion of the belting adjacent the upper surface. Such transverse compression stresses occur when a vertical load is applied to the central region of the upper surface of the belting, the longitudinal side edges of the belting being supported on rollers, as in the normal condition of operation of belting of this kind.

A tension-resisting layer 14 comprises a series of steel rods uniformly distributed along the length of the belting and extending transversely between the longitudinal edges 12 of the belting. The central portions 15 of the rods are troughed so that they are spaced, in the central portion of the belting, from the compression-resisting layer 11. The ends of the steel rods curve upwards through the body of the belting and terminate adjacent the longitudinal edges of the compression-resisting layer 11. The steel rods are smoothly curved in their central and side portions, but are bent at their upper ends 16 into alignment with the transverse direction of the compression-resisting layer 11. The tension-resisting layer 14 of steel rods, the compression-resisting layer 11 and the rubber body 10 of the belting are moulded together and vulcanized together as an integral structure, the arrangement being such as to provide the effect of a reinforced beam when considered in a transverse cross section.

The belt is supported, at least for the load-carrying portion of its travel, by rollers, not shown, which engage under the edges of the belt, as indicated by the arrows 17.

In operation the belting described above has a high rigidity, considered in the transverse vertical plane, and is thus able to withstand considerable loads placed on its upper surface 13 without undue vertical deflection of its central region. On the other hand, the series of steel rods which form the tension-resisting layer 14 do not unduly increase the stiffness of the belting considered in a longitudinal vertical plane, and thus permit the belting to pass easily around pulleys or rollers at the end of each belting run.

Figure 2:
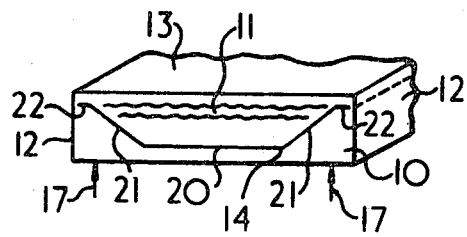
FIGS. 2, 3 and 4 are cross sections, similar to that of FIG. 1, of other forms of belt.

FIG. 2 illustrates an embodiment in which in the tension-resisting layer 14, the central portions 20 of the steel rods are straight and parallel to the transverse direction, the two side portions 21 extending upwardly in straight lines at an angle to the transverse direction and their upper ends 22 are bent parallel to the central portion. The construction of the belting is otherwise similar to that of the embodiment illustrated in FIG. 1.

Figure 3:
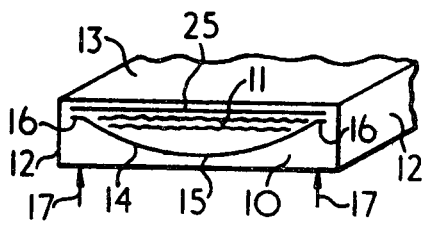

FIG. 3 illustrates a modification of the embodiment of FIG. 1, an additional layer 25 of steel rods being incorporated in the compression-resisting layer, the rods of the additional layer 25 lying close to and parallel with the upper surface of the belting 13. The layer 25 increases the resistance to compression.

In certain circumstances, for example for wide belts, and heavily loaded belts, the amount by which the central portion of the tension-resisting layer is spaced from the layer of compression-resisting layer may result in an unduly great thickness of the belt. The belt will be heavy and expensive.

Figure 4:
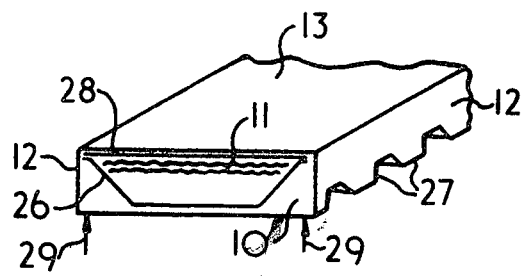

FIG. 4 illustrates an arrangement in which the tension-resisting layer 26 is comprised of steel rods similar in form to the rods in the arrangement of FIG. 2. However, the rods of the layer 26 are spaced apart in groups and the belt is moulded so as to provide a transversely ribbed profile 27 on the lower surface, the groups of rods 26 being located in the ribs. Further rods may be provided, at reduced depth, to reinforce the areas of the belt between the ribs and thus to form a layer of longitudinally uniformly spaced tension-resisting rods. It will be seen that an additional layer 28 of steel rods is incorporated in the compression-resisting layer 11. The belt is supported by rollers, not shown, which engage under the edges of the belt, as indicated at 29. In this instance, however, the rollers will have a cross-section suitable for engaging with the ribbed profile 27.

The embodiment illustrated in FIG. 4 has the advantage that the tensile layer 26 of steel rods is more effective with an increased spacing between the tensile layer 26 and the compression layer 11 in the central region of the belting. This spacing is increased, in this embodiment, without the excessive expense which would be incurred if the tension-resisting layer were formed as a longitudinally continuous layer encased in a relatively large volume of rubber. Further, the ribbed nature of the under surface of the belting reduces the stresses set up in the longitudinal fabric layer 11 as the belt passes around the terminal pulleys.

Figure 5:
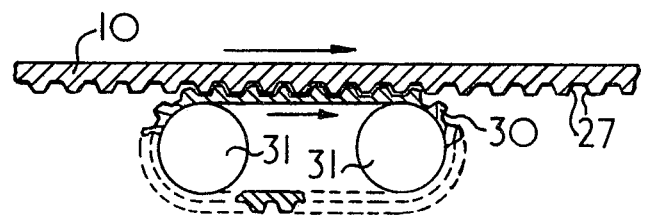
FIG. 5 is a longitudinal cross section through a belt, similar to that of FIG. 4 illustrating a driving method therefore.

An additional advantage of the embodiment of FIG. 4 is that the ribs forming the lower surface of the belting can be used as teeth meshing with intermediate drives positioned at intervals along the length of the belting to reduce the longitudinal tensile stress in the belting. An example of an intermediate drive is illustrated in FIG. 5, and comprises short endless lengths of toothed drive belting 30 meshing with the conveyor belt teeth, each driving belt 30 supported on a pair of spaced pulleys 31, one of which is driven.

Figure 6:
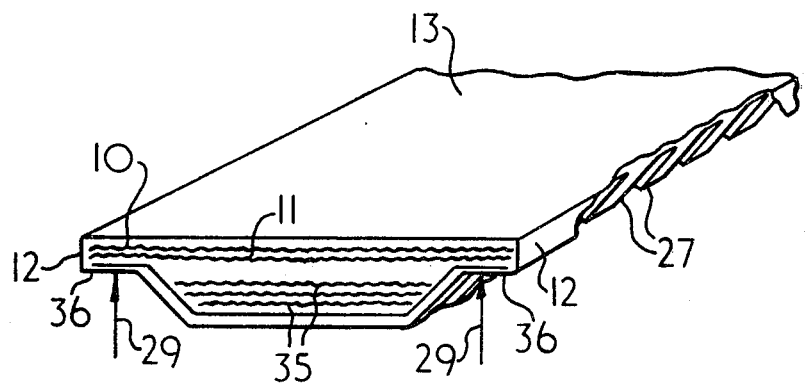
FIG. 6 is a transverse cross section, similar to that of FIG. 1, of a further form of belt.

In the further embodiment, illustrated in FIG. 6, the reinforcement of the belting comprises a tension-resisting layer 26 of the same form as described above with reference to FIG. 4. The belting is also of a ribbed form as in FIG. 4. However, in this embodiment the longitudinal tension-resisting layer 11 extends to the edges 11 and 12 of the belt, overlying the remaining part of the reinforced structure. The tension-resisting layer 26 is located within the ribbed portion of the belting.

In the embodiments described above, with reference to FIGS. 4, 5 and 6, the lower surface of the belt is formed as a series of longitudinally spaced ribs. In order that these ribs will function satisfactorily to provide a rigid support for the belting, it is desirable to stabilize the ribs against any tendency to bulge or distort in the longitudinal direction of the belting under compression caused by vertical shear forces set up when the belt is subjected to vertical loads applied to its upper surface. This stabilization may be effected by the provision of layers of textile fabric 35 (FIG. 6), for example of square woven form, superimposed above one another to form a laminated rubber/fabric structure in each rib.

Also illustrated in FIG. 6 is a modification in which the edge portions 36 are reduced in thickness, as compared with the belt illustrated in FIG. 4. This provides a reduction in weight and of material used and the transverse cross-section can also be utilized to provide guidance. Also, the under surfaces of the edge portions 36 will be smooth, for co-operation with circular support rollers.

Although in the embodiments described, the tension-resisting layers have been described as being of steel rods, other forms can be used. Thus, steel wires in the form of cord or cable can be used. Also, materials other than steel, depending upon the strength required in the tension-resisting layers.

Although in the embodiments described above the belting in accordance with the invention is primarily intended to be used in passenger conveyor applications a transversely rigid conveyor belt in accordance with the invention is suitable for other uses such as for carrying boxes, containers, etc. and for use in manufacturing assembly lines and other purposes where it would replace well-known conveyor systems in which a conveyor belt is supported by a metal plate on which the belt rests and over which it slides. The conventional system involves considerable friction, wear, tensile stresses in the belt and waste of power, and these disadvantages are overcome by the use of belting in accordance with the invention.

The upper surface of the belting described above can be flat, ribbed or of special design to retain boxes or material to be carried.

Having now described my invention — what I claim is:

1. A belt for conveying loads having an upper surface for supporting the loads and a lower surface, comprising: a body of flexible material; a layer of compression-resisting material extending transversely of the belt to resist transverse compression; and a layer of tension-resisting material extending transversely of the belt to resist transverse tension; the layer of tension-resisting material being of a trough-shape considered in a transverse cross section, at least the center portion of the layer of tension-resisting material spaced from the layer of compression-resisting material, the tension-resisting layer being divided into a plurality of spaced-apart transversely extending sections, the lower surface of the belt run being of a ribbed formation, the ribs extending transversely of the belt and containing the spaced-apart sections of the tension-resisting layer, at least one section to a rib.

2. A belt as claimed in claim 1, wherein the compression-resisting layer comprises a composite layer and includes at least one layer of textile material.

3. A belt as claimed in claim 1, wherein the compression-resisting layer comprises at least one reinforcing layer extending the length of the belt to provide a longitudinal tension-resisting layer.

4. A belt as claimed in claim 1 wherein the tension-resisting layer comprises steel rods.

5. A belt as claimed in claim 1 wherein the tension-resisting layer comprises steel wire in the form of cord or cable.

6. A belt as claimed in claim 1 wherein the center portion of the layer of tension-resisting material is of arcuate form.

7. A belt as claimed in claim 1 wherein the layer of tension-resisting material extends parallel to the layer of compression-resisting material for the center portion of the tension-resisting layer, the tension-resisting layer extending at its side portions towards the compression-resisting layer.

8. A belt as claimed in claim 1 the compression-resisting layer including at least one layer of transversely extending steel members.

9. A belt as claimed in claim 1, including at least one layer of fabric in each rib and extending parallel to the surfaces of the belt, to restrict bulging of the sides of the ribs in a direction normal to the length of the belt.

10. A belt as claimed in claim 1, the transverse ribs adapted to engage with driving means for driving the belt.

* * * * *